US007962371B2

(12) United States Patent
Matsui et al.

(10) Patent No.: US 7,962,371 B2
(45) Date of Patent: Jun. 14, 2011

(54) COMMODITY PRESENTING METHOD AND SYSTEM THEREFOR

(75) Inventors: Yoshiyuki Matsui, Isehara (JP); Yukio Fukui, Isehara (JP); Toshiyuki Takahashi, Isehara (JP)

(73) Assignee: Amada Company, Limited, Kanagawa (JP)

( * ) Notice: Subject to any disclaimer, the term of this patent is extended or adjusted under 35 U.S.C. 154(b) by 1315 days.

(21) Appl. No.: 10/362,683

(22) PCT Filed: Aug. 31, 2001

(86) PCT No.: PCT/JP01/07558
§ 371 (c)(1),
(2), (4) Date: Mar. 4, 2003

(87) PCT Pub. No.: WO02/21360
PCT Pub. Date: Mar. 14, 2002

(65) Prior Publication Data
US 2003/0182149 A1    Sep. 25, 2003

(30) Foreign Application Priority Data
Sep. 5, 2000   (JP) .............................. P2000-268837

(51) Int. Cl.
    *G06Q 30/00*   (2006.01)
(52) U.S. Cl. ............. 705/26.1; 705/8; 705/11; 705/27.1
(58) Field of Classification Search .................. 705/26.1
    See application file for complete search history.

(56) References Cited

U.S. PATENT DOCUMENTS

| | | | | |
|---|---|---|---|---|
| 5,229,948 A * | 7/1993 | Wei et al. ........................ 700/99 |
| 5,280,425 A * | 1/1994 | Hogge .......................... 712/300 |
| 5,764,543 A * | 6/1998 | Kennedy ........................... 703/2 |
| 5,848,394 A * | 12/1998 | D'Arrigo et al. .................. 705/8 |
| 5,907,490 A * | 5/1999 | Oliver .............................. 700/90 |
| 5,937,364 A * | 8/1999 | Westgard et al. ............... 702/83 |
| 6,032,123 A * | 2/2000 | Jameson ........................... 705/8 |
| 6,038,540 A * | 3/2000 | Krist et al. ........................ 705/8 |
| 6,169,979 B1 * | 1/2001 | Johnson ........................ 705/412 |
| 6,351,734 B1 * | 2/2002 | Lautzenheiser et al. .......... 705/8 |
| 6,366,889 B1 * | 4/2002 | Zaloom ............................. 705/7 |
| 6,591,232 B1 * | 7/2003 | Kassapoglou .................... 703/2 |
| 7,139,999 B2 * | 11/2006 | Bowman-Amuah .......... 717/101 |
| 7,315,826 B1 * | 1/2008 | Guheen et al. .................... 705/7 |

FOREIGN PATENT DOCUMENTS

| | | |
|---|---|---|
| EP | 1098264 | 5/2001 |
| JP | 10207955 | 8/1998 |
| JP | 2000-148847 | 5/2000 |
| WO | 00/04471 | 1/2000 |

OTHER PUBLICATIONS

Thayer C. Taylor, Catalogs come of age, Dec. 1993, Sales and Marketing Management, vol. 145, Iss. 15.*
English Language Abstract of JP 10-207955, Aug. 7, 1998.
English Language Abstract of JP 2000-148847, May 30, 2000.
"Kokyaku ga Kiten no 'Pull-gata' Eigyou Kakushin", by Akiyama et al., Nikkei Joho Strategy, vol. 8, No. 2, pp. 20-35, Nikkei BP K.K. (Japan), published Feb. 24, 1999.

* cited by examiner

*Primary Examiner* — Kirsten S Apple
*Assistant Examiner* — Scott S Trotter
(74) *Attorney, Agent, or Firm* — Greenblum & Bernstein, P.L.C.

(57) ABSTRACT

A merchandise presentation method includes: a step of preparing a standard value relating to work data, which specifies work performed by a user; a step of obtaining actual work data, which specifies the work actually performed by each user with respect to the work; a step of comparing the actual work data with the standard value; a step of selecting any one of a plurality of merchandise or a combination thereof, based on the comparison result; a step of calculating increasing profit by using at least one of the selected merchandise; and a step of presenting to the user the content of at least one of the selected merchandise and the increasing profit.

20 Claims, 16 Drawing Sheets

| | User data | |
|---|---|---|
| Type of business | | |
| Size | | Person |
| Workpiece item | | Item/day |
| Number of lots | | Pieces/item |
| New ratio | | % |
| Design change ratio | | % |
| Repeat ratio | | % |
| Double checking time | | Minute |
| Percent defective in development | | % |
| Paper drawing ratio | | % |
| Electronic drawing ratio | | % |
| Work dividing ratio | | % |

Information to be obtained

Example of obtained information

413b

| | User data |
|---|---|
| Type of business | OA/FA computer |
| Size | 30 |
| Workpiece item | 60 |
| Number of lots | 30 |
| New ratio | 20 |
| Design change ratio | 5 |
| Repeat ratio | 35 |
| Double checking time | 30 |
| Percent defective in development | 25 |
| Paper drawing ratio | 90 |
| Electronic drawing ratio | 10 |
| Work dividing ratio | 10 |

FIG.6

613a — 201×203, 201×205 (Data by law learned by experience 205, 214), 201×207 (207, 213)

|  | Difference | Time reduction weight | Time reduction point | Defect rejection weight | Defect rejection point | Technology handing down weight | Technology handing down point |
|---|---|---|---|---|---|---|---|
| Size | 0 |  |  |  |  |  |  |
| Workpiece item | 10 | 5 | 50 | 5 | 50 | 5 | 50 |
| Number of lots | -10 | 5 | -50 | 5 | -50 | 5 | 50 |
| New ratio | 5 | 80 | 400 | 50 | 250 | 10 | 50 |
| Design change ratio | 0 | 5 | 0 | 5 | 0 | 5 | 0 |
| Repeat ratio | 5 | 5 | 25 | 5 | 25 | 60 | 300 |
| Double checking time | 0 | 60 | 0 | 30 | 0 | 5 | 0 |
| Percent defective in development | 0 | 5 | 0 | 60 | 0 | 20 | 0 |
| Paper drawing ratio | -10 | 20 | -200 | 30 | -300 | 5 | -50 |
| Electronic drawing ratio | 10 | 50 | 500 | 10 | 100 | 5 | 50 |
| Work dividing ratio | 5 | 70 | 350 | 40 | 200 | 10 | 50 |
| Total |  |  | (1075) |  | 275 |  | 500 |

613b — 217 ⇨ Field of time reduction merchandise

|  | Difference | Time reduction weight | Time reduction point | Defect rejection weight | Defect rejection point | Technology handing down weight | Technology handing down point |
|---|---|---|---|---|---|---|---|
| Size | 0 |  |  |  |  |  |  |
| Workpiece item | 7 | 30 | 210 | 40 | 280 | 5 | 35 |
| Number of lots | 5 | 20 | 100 | 5 | 25 | 30 | 150 |
| New ratio | 5 | 20 | 100 | 50 | 250 | 50 | 250 |
| Design change ratio | -3 | 5 | -15 | 5 | -15 | 5 | -15 |
| Repeat ratio | 5 | 20 | 100 | 80 | 400 | 40 | 200 |
| Double checking time | 0 | 60 | 0 | 30 | 0 | 20 | 0 |
| Percent defective in development | 5 | 5 | 25 | 60 | 300 | 10 | 50 |
| Paper drawing ratio | -15 | 80 | -1200 | 5 | -75 | 20 | -300 |
| Electronic drawing ratio | 15 | 60 | 900 | 10 | 150 | 5 | 75 |
| Work dividing ratio | 10 | 20 | 200 | 20 | 200 | 10 | 100 |
| Total |  |  | 420 |  | (1515) |  | 545 |

613c — 218 ⇨ Field of defect rejection merchandise

|  | Difference | Time reduction weight | Time reduction point | Defect rejection weight | Defect rejection point | Technology handing down weight | Technology handing down point |
|---|---|---|---|---|---|---|---|
| Size | 0 |  |  |  |  |  |  |
| Workpiece item | 15 | 5 | 75 | 5 | 75 | 80 | 1200 |
| Number of lots | -10 | 20 | -200 | 5 | -50 | 5 | -50 |
| New ratio | 10 | 30 | 300 | 50 | 500 | 80 | 800 |
| Design change ratio | 0 | 5 | 0 | 5 | 0 | 80 | 0 |
| Repeat ratio | 5 | 5 | 25 | 5 | 25 | 60 | 300 |
| Double checking time | 15 | 20 | 300 | 30 | 450 | 50 | 750 |
| Percent defective in development | -5 | 5 | -25 | 60 | -300 | 40 | -200 |
| Paper drawing ratio | -30 | 20 | -600 | 30 | -900 | 5 | -150 |
| Electronic drawing ratio | 30 | 50 | 1500 | 10 | 300 | 5 | 150 |
| Work dividing ratio | 5 | 50 | 250 | 40 | 200 | 80 | 400 |
| Total |  |  | 1675 |  | 300 |  | (3200) |

Field of technology handing down merchandise ⇦ 219

FIG.8

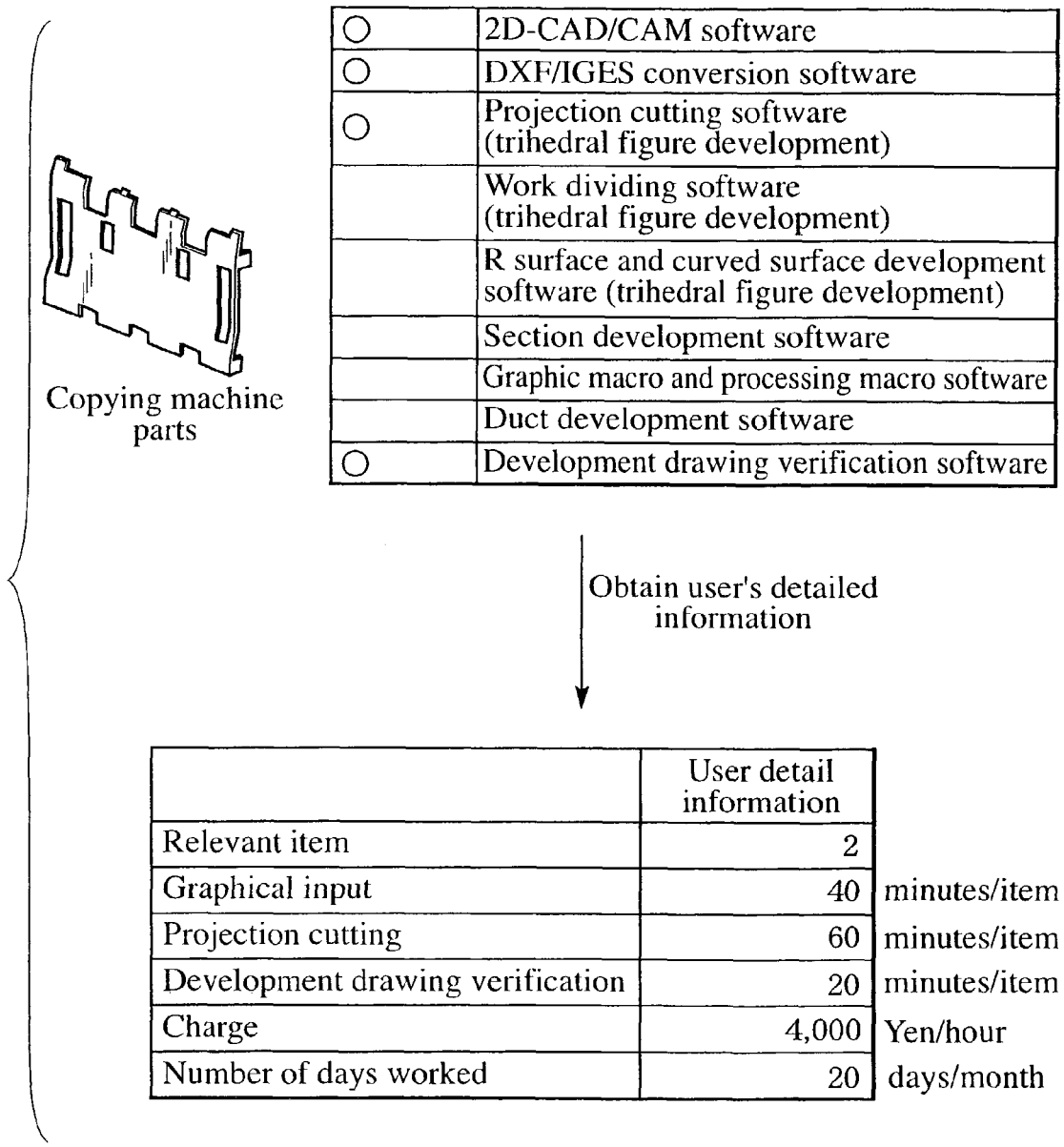

| ○ | 2D-CAD/CAM software |
|---|---|
| ○ | DXF/IGES conversion software |
| ○ | Projection cutting software (trihedral figure development) |
|   | Work dividing software (trihedral figure development) |
|   | R surface and curved surface development software (trihedral figure development) |
|   | Section development software |
|   | Graphic macro and processing macro software |
|   | Duct development software |
| ○ | Development drawing verification software |

Copying machine parts

Obtain user's detailed information ↓

|  | User detail information |  |
|---|---:|---|
| Relevant item | 2 |  |
| Graphical input | 40 | minutes/item |
| Projection cutting | 60 | minutes/item |
| Development drawing verification | 20 | minutes/item |
| Charge | 4,000 | Yen/hour |
| Number of days worked | 20 | days/month |

FIG.9

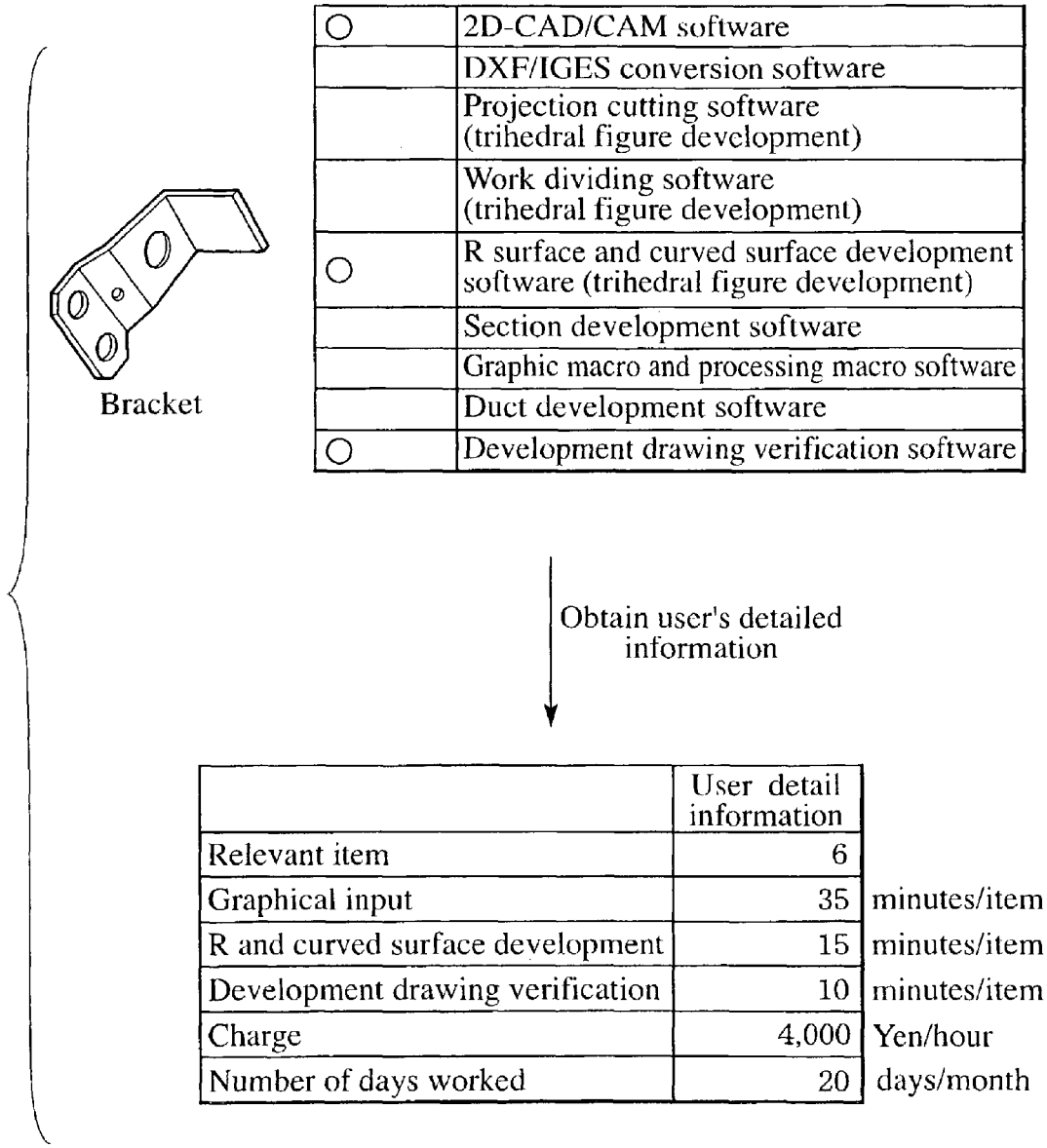

Bracket

| | |
|---|---|
| ○ | 2D-CAD/CAM software |
| | DXF/IGES conversion software |
| | Projection cutting software (trihedral figure development) |
| | Work dividing software (trihedral figure development) |
| ○ | R surface and curved surface development software (trihedral figure development) |
| | Section development software |
| | Graphic macro and processing macro software |
| | Duct development software |
| ○ | Development drawing verification software |

↓ Obtain user's detailed information

| | User detail information | |
|---|---:|---|
| Relevant item | 6 | |
| Graphical input | 35 | minutes/item |
| R and curved surface development | 15 | minutes/item |
| Development drawing verification | 10 | minutes/item |
| Charge | 4,000 | Yen/hour |
| Number of days worked | 20 | days/month |

FIG.10

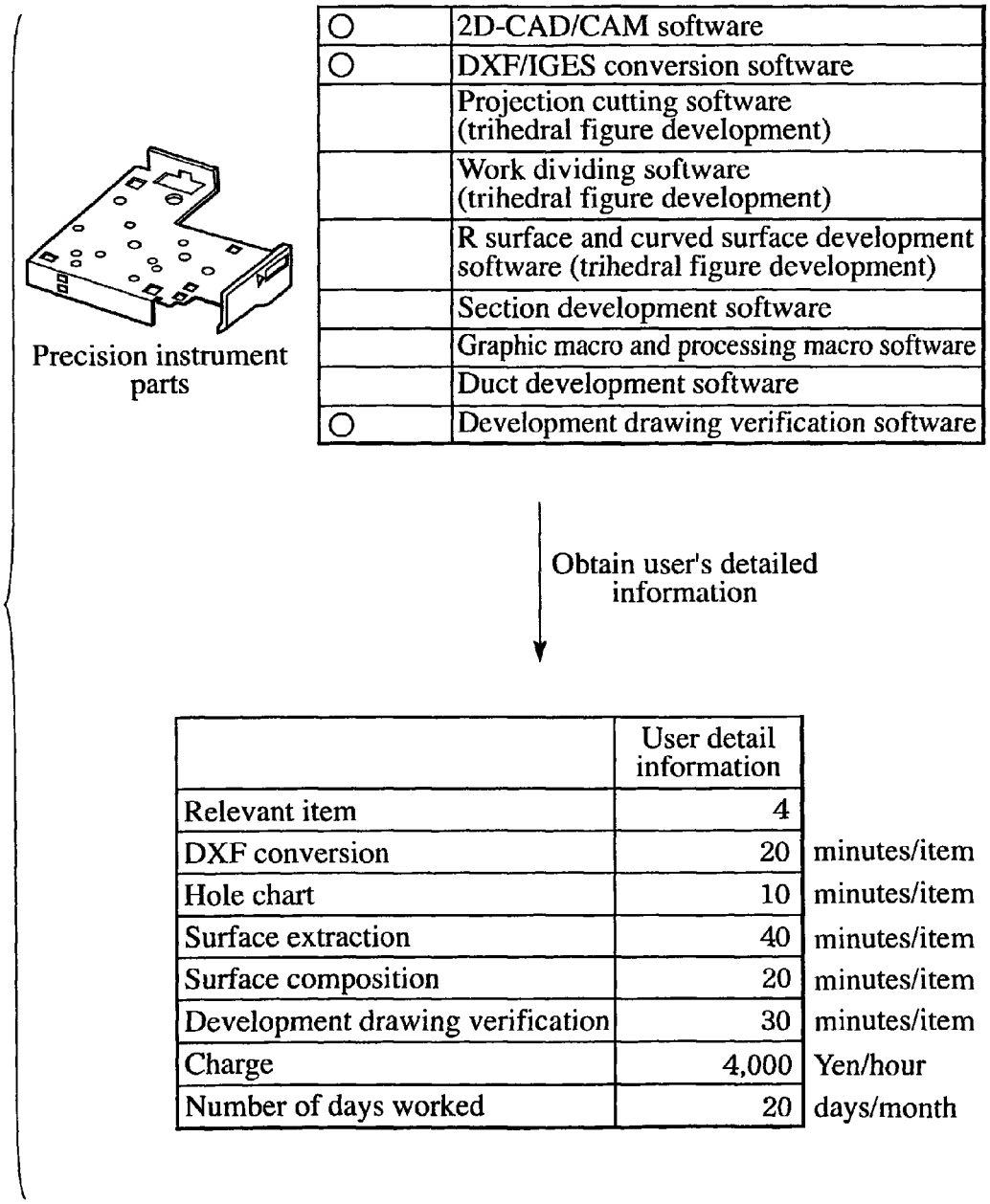

Precision instrument parts

| | |
|---|---|
| ○ | 2D-CAD/CAM software |
| ○ | DXF/IGES conversion software |
| | Projection cutting software (trihedral figure development) |
| | Work dividing software (trihedral figure development) |
| | R surface and curved surface development software (trihedral figure development) |
| | Section development software |
| | Graphic macro and processing macro software |
| | Duct development software |
| ○ | Development drawing verification software |

Obtain user's detailed information

| | User detail information | |
|---|---|---|
| Relevant item | 4 | |
| DXF conversion | 20 | minutes/item |
| Hole chart | 10 | minutes/item |
| Surface extraction | 40 | minutes/item |
| Surface composition | 20 | minutes/item |
| Development drawing verification | 30 | minutes/item |
| Charge | 4,000 | Yen/hour |
| Number of days worked | 20 | days/month |

FIG.11A

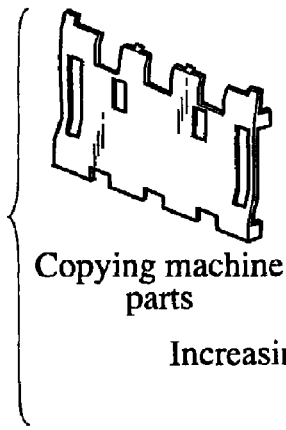

Copying machine parts

| | User detail information | Standard value | Difference |
|---|---|---|---|
| Graphical input | 40 | 10 | 30 |
| Projection cutting | 60 | 12 | 48 |
| Development drawing verification | 20 | 10 | 10 |
| | | Total | 88 |

Increasing profit = difference × number of relevant items
× number of days worked × charge
= 88 × 2 × 20 × 4000/60 = 234,667 Yen/month

FIG.11B

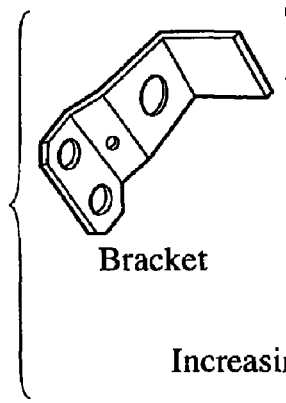

Bracket

| | User detail information | Standard value | Difference |
|---|---|---|---|
| Graphical input | 35 | 18 | 17 |
| R and curved surface development | 15 | 6 | 9 |
| Development drawing verification | 10 | 3 | 7 |
| | | Total | 33 |

Increasing profit = difference × number of relevant items
× number of days worked × charge
= 33 × 6 × 20 × 4000/60 = 264,000 Yen/month

FIG.11C

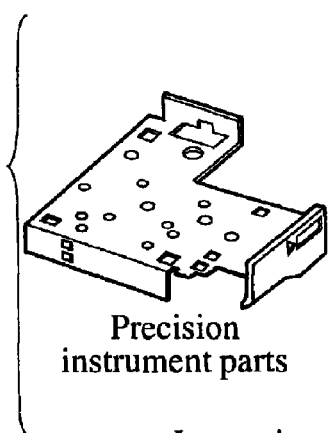

Precision instrument parts

| | User detail information | Standard value | Difference |
|---|---|---|---|
| DXF conversion | 20 | 6 | 14 |
| Hole chart | 10 | 3 | 7 |
| Surface extraction | 40 | 10 | 30 |
| Surface composition | 20 | 5 | 15 |
| Development drawing verification | 30 | 14 | 16 |
| | | Total | 82 |

Increasing profit = difference × number of relevant items
× number of days worked × charge
= 82 × 4 × 20 × 4000/60 = 437,333 Yen/month

FIG.12A

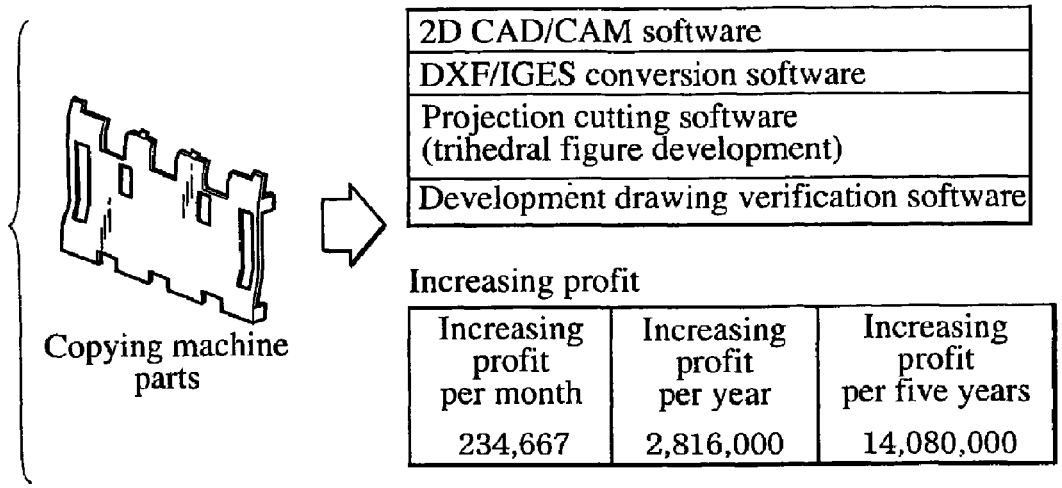

Copying machine parts

| 2D CAD/CAM software |
| DXF/IGES conversion software |
| Projection cutting software (trihedral figure development) |
| Development drawing verification software |

Increasing profit

| Increasing profit per month | Increasing profit per year | Increasing profit per five years |
|---|---|---|
| 234,667 | 2,816,000 | 14,080,000 |

FIG.12B

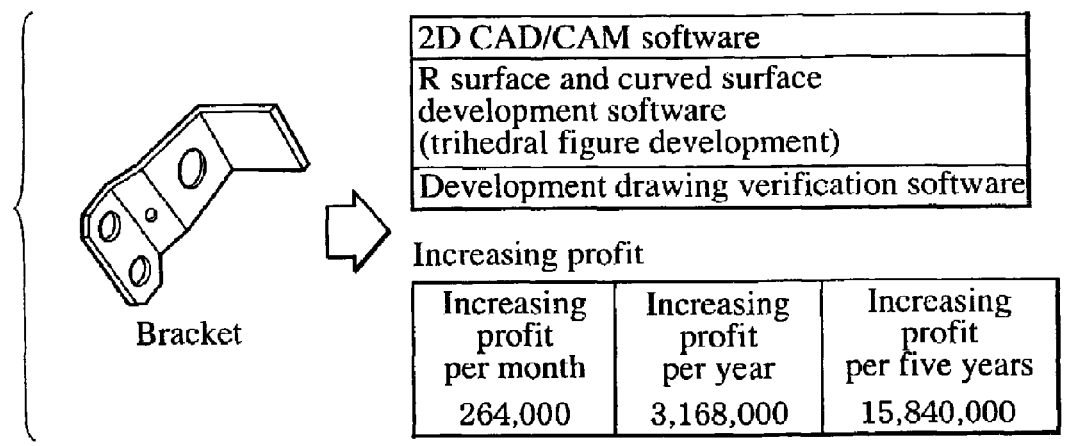

Bracket

| 2D CAD/CAM software |
| R surface and curved surface development software (trihedral figure development) |
| Development drawing verification software |

Increasing profit

| Increasing profit per month | Increasing profit per year | Increasing profit per five years |
|---|---|---|
| 264,000 | 3,168,000 | 15,840,000 |

FIG.12C

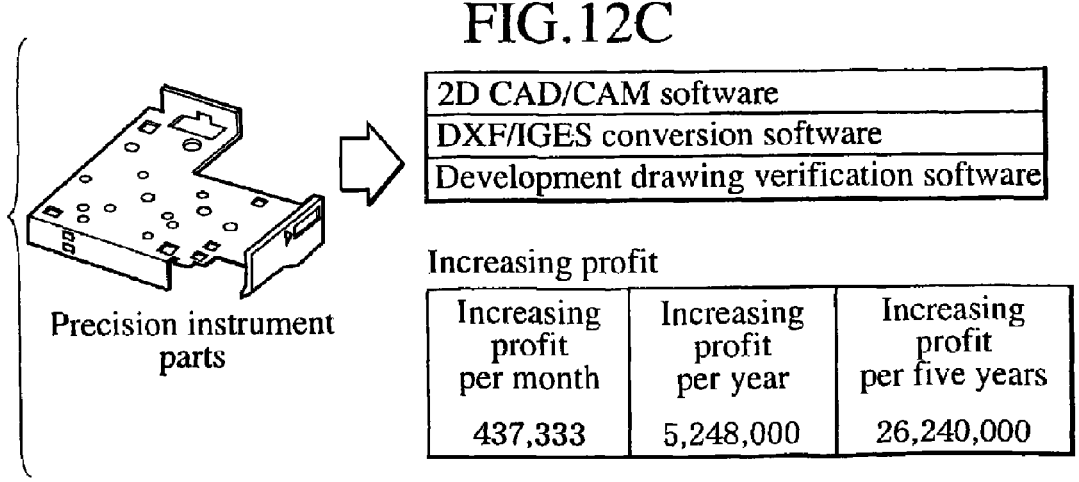

Precision instrument parts

| 2D CAD/CAM software |
| DXF/IGES conversion software |
| Development drawing verification software |

Increasing profit

| Increasing profit per month | Increasing profit per year | Increasing profit per five years |
|---|---|---|
| 437,333 | 5,248,000 | 26,240,000 |

FIG.13

| Item | Standard value |
| --- | --- |
| Size | 30 |
| Workpiece item | 50 |
| Number of lots | 40 |
| New ratio | 15 |
| Design change ratio | 5 |
| Repeat ratio | 30 |
| Double-checking time | 30 |
| Percent defective in development | 20 |
| Paper drawing ratio | 90 |
| Electronic drawing ratio | 10 |
| Work dividing ratio | 5 |

| Classification | | Name |
|---|---|---|
| Time reduction software | | 2D-CAD/CAM software |
| | | DXF/IGES conversion software |
| | | Projection cutting software |
| | | Work dividing software |
| | | R surface and curved surface development software |
| | | Section development software |
| | | Graphic macro and processing macro software |
| | | Duct development software |
| | | Development drawing verification software |
| Defect rejection software | | Development drawing verification software |
| | | Patch type stereograph software |
| | | Prototype verification software |
| Technology handing down software | | Vending and expert system |
| | | Double production prevention software |

| Product / Type of business | Item | Time reduction software | Standard work data | Defect rejection software | Standard work data | Technology handing down software | Standard work data |
|---|---|---|---|---|---|---|---|
| OA/FA computer etc. | Copying machine parts | Time reduction software group A | DA1 | Defect rejection software group A | DA2 | Technology handing down software group A | DA3 |
| | Bracket | Time reduction software group B | DB1 | Defect rejection software group B | DB2 | Technology handing down software group B | DB3 |
| | Precision instrument parts | Time reduction software group C | DC1 | Defect rejection software group C | DC2 | Technology handing down software group C | DC3 |
| | ... | ... | ... | ... | ... | ... | ... |
| Switchboards and control panels | ... | ... | ... | ... | ... | ... | ... |
| | ... | ... | ... | ... | ... | ... | ... |
| | ... | ... | ... | ... | ... | ... | ... |
| | ... | ... | ... | ... | ... | ... | ... |
| Industrial and specialized instrumentation | ... | ... | ... | ... | ... | ... | ... |
| | ... | ... | ... | ... | ... | ... | ... |
| | ... | ... | ... | ... | ... | ... | ... |
| | ... | ... | ... | ... | ... | ... | ... |
| ... | | ... | ... | ... | ... | ... | ... |
| | | ... | ... | ... | ... | ... | ... |
| | | ... | ... | ... | ... | ... | ... |

13c

COMMODITY PRESENTING METHOD AND SYSTEM THEREFOR

TECHNICAL FIELD

The present invention relates to a merchandise presentation method for presenting any one of a plurality of merchandise or a combination thereof to users. More specifically, the present invention relates to a merchandise presentation method for presenting appropriate merchandise in accordance with the current state of a user, and profit increased by the merchandise.

BACKGROUND ART

In general, for example, when a seller supplies merchandise to a user, the seller preferentially presents the quality, cost, delivery time and the like for the merchandise that the user desires.

In other words, when a user purchases merchandise that he wants to purchase, he decides the merchandise to be bought, based on the own judgment, referring to the quality, performance, cost and delivery time presented from a plurality of merchandise. The user then purchases the merchandise, without analyzing, for example, the existing equipment that the user has, and without properly recognizing the value of the plurality of merchandise.

Such a conventional merchandise presentation method has problems described below.

That is, for example, there is a problem in that it is difficult to analyze the equipment that the user currently has, in association with the merchandise to be purchased.

On the other hand, there is a problem in that since it is difficult to understand all information of respective merchandise that the supplier has, it is difficult to judge which merchandise is to be selected.

When the user purchases the merchandise with his own judgment, since he purchases the merchandise without fully recognizing the value of the merchandise, it may not be said to be appropriate purchase.

Therefore, there is another problem in that it is difficult to calculate the increasing profit when the user purchases the merchandise, which is the information that the user wants to know finally.

The present invention has been achieved to solve the above problems, and it is an object of the present invention to provide a merchandise presentation method and a system therefor, by which a user can know the increasing profit by a merchandise, before the user actually purchases the merchandise, and can purchase the merchandise with correct judgment.

It is another object of the present invention to provide a merchandise presentation method and a system therefor, in which, for example, in the case of a sheet metal processing system, defects in the existing sheet metal processing system can be recognized by performing diagnosis of the system, thereby an appropriate sheet metal processing system can be obtained.

It is a further object of the present invention to provide a merchandise presentation method and a system therefor, in which general users can obtain appropriate merchandise by using Internet.

DISCLOSURE OF THE INVENTION

In order to achieve the above objects, a merchandise presentation method of the present invention based on a first aspect includes: a step of preparing a standard value relating to work data, which specifies work performed by a user; a step of obtaining actual work data, which specifies the work actually performed by each user with respect to the work; a step of comparing the actual work data with the standard value; a step of selecting any one of a plurality of merchandise or a combination thereof, based on the comparison result; a step of calculating increasing profit by using at least one of the selected merchandise; and a step of presenting to the user the content of at least one of the selected merchandise and the increasing profit.

In the merchandise presentation method based on a second aspect of the present invention, at least one merchandise is merchandise selected based on the product attribute, in the merchandise presentation method based on the first aspect.

A merchandise presentation method based on a third aspect of the present invention includes: an information acquisition step for acquiring user data, being information of work to be performed by a user and storing the data in a work file; a deviation generation step for reading the user data from the work file, and also reading standard value data, being information of standard work held by a merchandise supplier, from a master file, to compare this with the user data, generating deviation data, being a deviation of the user data with respect to the standard value data, and storing the deviation data in the work file; a deviation analysis step for reading the deviation data from the work file, and reading the analysis data used for the analysis of the work from the master file, to analyze the work content of the user based on these data, generating the analysis result data, being data of the analysis result, and storing the data in the work file; a merchandise specifying step for reading the analysis result data from the work file, and also reading merchandise data, being data of merchandise associated with the user's work, from the master file, to determine specific merchandise that prescribes the user's work, generating specific merchandise data, being the data of the specific merchandise, and storing the data in the work file; and an increasing profit calculation step for reading user detail data, being information for calculating the cost required for the user's work, and also reading the specific merchandise data, to calculate the increasing profit when using the specific merchandise, and storing the increasing profit in the work file.

In the merchandise presentation method based on a fourth aspect of the present invention, the user's work is work relating to production of sheet metal products, in the merchandise presentation method based on the first aspect, the second aspect and the third aspect.

In the merchandise presentation method based on a fifth aspect of the present invention, at the deviation analysis step, analysis is performed for dividing the work field into time reduction field for reducing working hour, a defect rejection field for reducing defective products, and a technology handing down field for accumulating the technology, in the merchandise presentation method based on the fourth aspect.

In the merchandise presentation method based on a sixth aspect of the present invention, the user can calculate the increasing profit by a computer connectable to the Internet, in the merchandise presentation method based on any one of the first to the fifth aspects.

A merchandise presentation system based on a seventh aspect of the present invention is a merchandise presentation system, which presents to a user any one of a plurality of merchandise or a combination thereof, including: means for preparing a standard value relating to the work data, which specifies work to be performed by a user; means for obtaining actual work data, which specifies work actually performed by each user with respect to the work; means for comparing the actual work data with the standard value, selecting anyone of the plurality of merchandise or a combination thereof, based on the comparison result, and calculating increasing profit by using at least one of the selected merchandise; and means for presenting to the user the content of at least one of the selected merchandise and the increasing profit.

In the merchandise presentation system based on an eighth aspect of the present invention, at least one merchandise is selected based on the product attribute, in the merchandise presentation method based on the seventh aspect.

A merchandise presentation system based on a ninth aspect is a merchandise presentation system, which presents to a user any one of a plurality of merchandise or a combination thereof, including: information acquisition means for acquiring user data, being information of work to be performed by the user and storing the data in a work file; deviation generation means for reading the user data from the work file, also reading standard value data, being information of standard work held by a merchandise supplier, from a master file, to compare this with the user data, generating deviation data, being a deviation of the user data with respect to the standard value data, and storing the deviation data in the work file; deviation analysis means for reading the deviation data from the work file, and reading the analysis data used for the analysis of the work from the master file, to analyze the work content of the user based on these data, generating the analysis result data, being data of the analysis result, and storing the data in the work file; merchandise specifying means for reading the analysis result data from the work file, and also reading merchandise data, being data of merchandise associated with the user's work, from the master file, to determine specific merchandise that prescribes the user's work, generating specific merchandise data, being the data of the specific merchandise, and storing the data in the work file; and increasing profit calculation means for reading user detail data, being information for calculating the cost required for the user's work, and also reading the specific merchandise data, to calculate the increasing profit when using the specific merchandise, and storing the increasing profit in the work file.

In the merchandise presentation system according to a tenth aspect of the present invention, the user's work is work relating to production of sheet metal products, in the merchandise presentation system based on any one of the seventh to the ninth aspects.

In the merchandise presentation system according to an eleventh aspect of the present invention, the deviation analysis means performs analysis for dividing the work field into time reduction field for reducing working hour, a defect rejection field for reducing defective products, and a technology handing down field for accumulating the technology, in the merchandise presentation system based on the tenth aspect.

In the merchandise presentation system according to a twelfth aspect of the present invention, the user can calculate the increasing profit by a computer connectable to the Internet, in the merchandise presentation system based on any one of the seventh to the eleventh aspects.

Therefore, according to the present invention, for example, before a user purchases an actual product, the user can know the increasing profit resulting from using the product, and hence the user can purchase the product with correct judgment.

Moreover, for example, in the case of a sheet metal processing system, defects in the existing sheet metal processing system can be recognized by performing diagnosis of the system, thereby an appropriate sheet metal processing system can be obtained.

Furthermore, general users can obtain appropriate merchandise by using Internet.

BRIEF DESCRIPTION OF DRAWINGS

FIG. 4 is a diagram for explaining input and output data.

FIG. 6 is a diagram for explaining input and output data.

FIG. 8 is a diagram for explaining input and output data.

FIG. 9 is a diagram for explaining input and output data.

FIG. 10 is a diagram for explaining input and output data.

FIGS. 11A, 11B and 11C are diagrams for explaining input and output data.

FIGS. 12A, 12B and 12C are diagrams for explaining input and output data.

FIG. 13 is a diagram for explaining a standard work file.

FIG. 14 is a diagram for explaining a software file.

FIG. 15 is a diagram for explaining a product-software relation file.

BEST MODE FOR CARRYING OUT THE INVENTION

Figure 1:
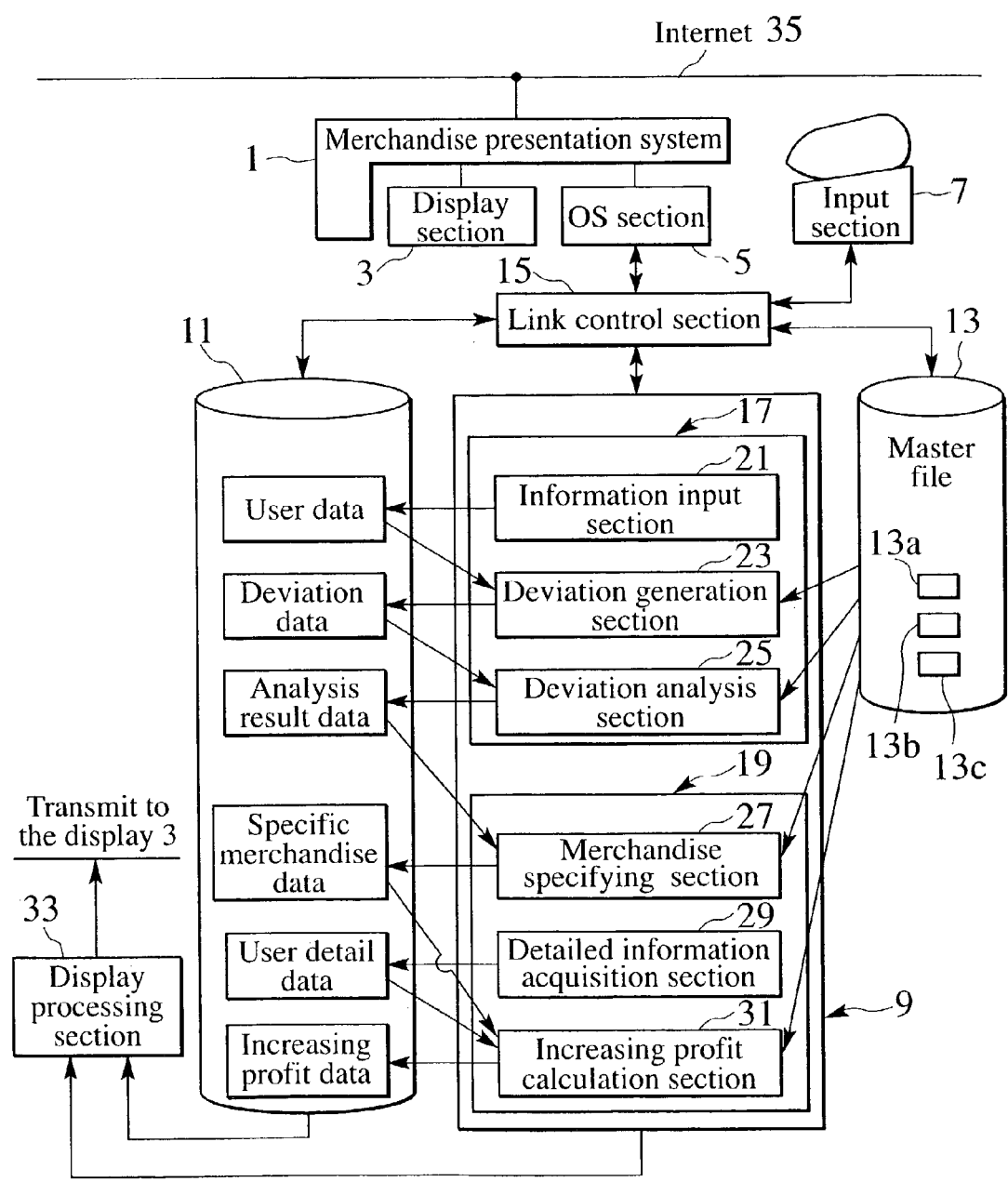
FIG. 1 is a schematic diagram showing the schematic configuration of a merchandise presentation system.

An embodiment of the present invention will be described, with reference to the drawings. In this embodiment, an appropriate computer software (program) for a CAD and CAM apparatus used by a user is presented as merchandise, with respect to the user who performs processing of sheet metal products.

The products manufactured by the user include: OA/FA computers; switchboards and control panels; industrial and specialized instrumentation; machine tools and covers; passenger cars, car bodies, and interior and exterior finish work; lockers and steel furniture; sashes and building metals; air-conditioning equipment; freezers and showcases for business use; vending machines and automatic servicing machines; communication and radio application equipment; medical equipment and X rays; physical and chemical analysis equipment; toys and gaming machines; measuring instruments and meters; precision instruments, and the like.

These products have various problems or difficulties in manufacturing, according to the types thereof, more specifically, a problem relating to the time reduction (reduction of working hours), a problem relating to defect rejection, and a problem relating to technology handing down. For example, the problem relating to time reduction is a problem in that since ordered products have recently tendencies to become complicated, and to be various kinds and small quantity, the working hours cannot be reduced.

The problem relating to the defect rejection is a problem in that many product defects occur resulting from the work performed by the user, due to a complicated shape of the product or the like, thereby decreasing the yield. The problem relating to the technology handing down is a problem in that the number of skilled engineers decreases, and the skills of these engineers are not handed down to young workers, thereby work accuracy and work efficiency decrease.

The computer software proposed for reducing the problems or difficulties includes:
1. 2D-CAD/CAM software
2. DXF/IGES conversion software
3. projection cutting software
4. work dividing software
5. R surface and curved surface development software
6. section development software
7. graphic macro and processing macro software
8. duct development software
9. development drawing verification software
10. batch type stereograph software
11. prototype verification software
12. vending and expert system
13. double production prevention software
14. three-dimensional editing software
15. automatic allotment software
16. sheet processing software
17. simulation software.

In the above list, 2D-CAD/CAM software stands for basic computer software, which performs product planning to preparation of processing data.

The DXF/IGES conversion software stands for computer software for preparing intermediate data for obtaining compatibility between drawing data of different VCAD/CAMs.

The projection cutting software stands for computer software for generating a shape existing on a curved surface of a three-dimensional model defined from a two-dimensional trihedral figure.

The work dividing software stands for computer software for dividing the product into a plurality of pieces.

The R surface and curved surface development software stands for computer software for developing an R surface and a curved surface.

The section development software stands for computer software for automatically preparing a three-dimensional figure and a development drawing by inputting a sectional shape of a product.

The graphic macro and processing macro software stands for computer software for performing die allotment in a portion where a patterned shape is registered and arranged.

The duct development software stands for computer software for automatically developing a duct.

The development drawing verification software stands for computer software for checking whether the development drawing is correct.

As described below, the above-described software is classified by three categories, the time reduction software, the defect rejection software, and the technology handing down software, and is proposed to a user in order to reduce the problems or difficulties in production.

FIG. 1 shows a schematic configuration of a merchandise presentation system 1 according to the embodiment.

The merchandise presentation system 1 comprises a computer, and includes a computer body (not shown), and an input and output unit such as a mouse and a keyboard.

The merchandise presentation system 1 comprises a display section 3 for performing input and output of various data, and an OS section 5 for controlling basic functions of the computer. Further, an input section 7 for inputting work data of a user, an overall control section 9 for controlling each processing from obtaining the work information of the user until the increasing profit of the user when purchasing specific merchandise is calculated, a work file 11 for temporarily storing the data as required, at the time of performing each processing, and a master file 13 for storing standard value data of the work, analysis data, merchandise data, and data that becomes a base for calculating the increasing profit are linked to the OS section 5 by a link control section 15.

More specifically, the master file 13 stores a standard work file 13a, a software file 13b, a product-software relation file 13c and the like, as data or a file. The contents of the standard work file 13a, the software file 13b and the product-software relation file 13c are as follows.

Standard Work File 13a

The standard work file 13a stores work environment, work contents and the like of a standard user in the respective types of business. More specifically, this file stores work environment, work contents and the like of a standard user for each workpiece item described below, classified by a plurality of items.

1. Size of user's company
2. Workpiece items, being types of products processed by a user per day
3. Number of lots, being the number of workpiece corresponding to the workpiece items
4. New ratio, being a ratio of a new product in the products handled by the user
5. Design change ratio, being a ratio of a case where there is a design change in the ordered products
6. Repeat ratio, being a ratio of processing the same or similar product
7. Time for double-checking, which is performed by another person whether the development is correct, when processing is performed according to a prepared program
8. Percent defective in development, which occurs at the time of developing the product drawing
9. Paper drawing ratio, being a ratio of a case where the drawing of a product received by the user from an orderer is a sheet of paper
10. Electronic drawing ratio, being a ratio of a case where the drawing of a product received by the user from an orderer is an electronic drawing, and
11. Work dividing ratio, being a ration of a case where it is necessary to divide the product, when a product is manufactured.

The above is the work environment and workload of a standard user for each workpiece item. FIG. 13 shows the standard work file 13a of a user in a type of business of OA/FA computer manufacturing.

Software File 13b

The software file 13b classifies the computer software as merchandise by the time reduction software, the defect rejection software, and the technology handing down software, and stores these. The time reduction software stands for computer software for reducing the working hours of the user. The defect rejection software stands for computer software that enables reduction of product defects, which occurs resulting from the work performed by the user. The technology handing down software enables, for example, accumulation of know-how in manufacturing the product, accumulated by the user, to use it for next processing.

FIG. 14 shows the software file 13b of the computer software, as the merchandise stored in this manner.

Product-Software Relation File 13c

The product-software relation file 13c stores the products manufactured by the user and software groups most suitable for these products, associated with the problems or difficulties (time reduction problem, defect rejection problem and technology handing down problem) that the user has. Also in this file, standard work data when each product is manufactured using the optimum software is stored. The standard work data is classified by each workpiece item and stored, as described below.

FIG. 15 shows one example of the contents stored in the product-software relation file 13c.

In FIG. 15, for example, the time reduction software group A is a time reduction software group selected for solving a problem, which is expected to occur associated with manufacturing of parts of a copying machine, in the time reduction software groups in FIG. 14. Moreover, the time reduction software group B is a time reduction software group selected for solving a problem, which is expected to occur associated with manufacturing of brackets, in the time reduction software groups in FIG. 14. In other words, as described later in detail, even in the same time reduction software, a problem occurring at the time of manufacturing the parts of a copying machine and a problem occurring at the time of manufacturing the brackets are different. Therefore, the time reduction software proposed to the manufacturers of copying machine parts is different from the time reduction software proposed to the manufacturers of brackets. For other products, a set of the optimum software is selected and stored for each problem (time reduction problem, defect rejection problem and technology handing down problem) that is expected to occur for each of the respective products. Moreover, the standard work data when the respective products are manufactured using the optimum software is stored.

Referring again to FIG. 1, the overall control section 9 comprises a work analysis control section 17 for analyzing the user's work in order to specify the merchandise presentation field, and an effect calculation control section 19, which determines merchandise based on the analysis result and calculates the increasing profit. Moreover, the work analysis control section 17 comprises an information input section 21, a deviation generation section 23, and a deviation analysis section 25.

The information input section 21 performs processing for obtaining information for understanding the user's work. The deviation generation section 23 performs processing for comparing the user's work with the standard work, to obtain a difference between the user's work and the standard work. The deviation analysis section 25 performs processing for specifying the field where a load is applied in the user's work, based on the difference between the user's work and the standard work.

The effect calculation control section 19 comprises a merchandise specifying section 27, a detailed information acquisition section 29, and an increasing profit calculation section 31. The merchandise specifying section 27 specifies merchandise based on the product attribute. The product attribute stands for a feature of the product manufactured by the user. The detailed information acquisition section 29 performs processing for acquiring data (user data or work data) necessary for calculating the amount, with respect to the work performed by the user corresponding to the specified merchandise. The increasing profit calculation section 31 performs processing for calculating the increasing profit, when the specified merchandise is used, based on the data acquired by the detailed information acquisition section 29. The content of the merchandise is presented to the user in the display section 3 by the display processing section 33. The merchandise presentation system 1 of the present invention is connected to the Internet 35 as shown in FIG. 1.

Figure 2:
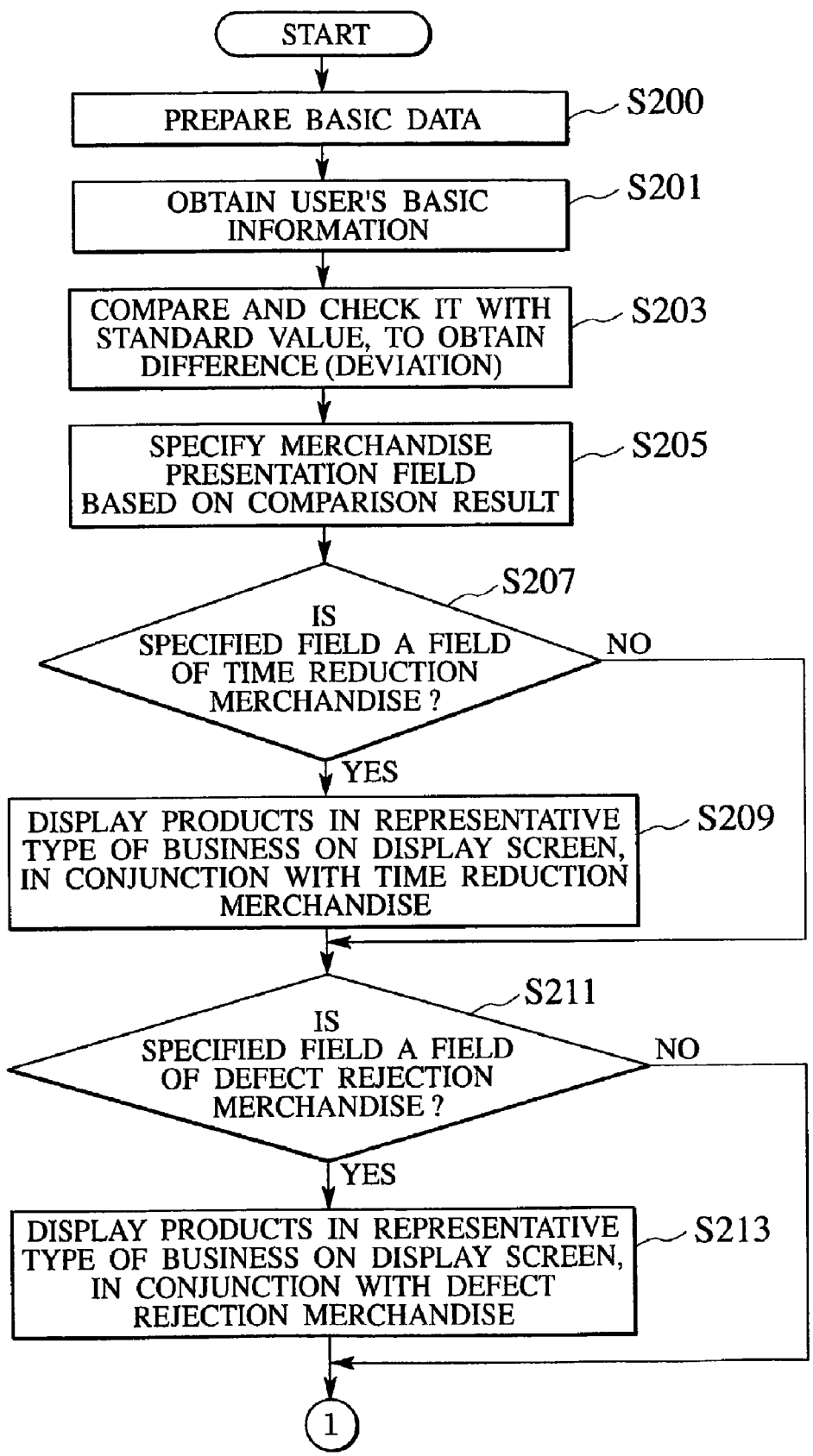
FIG. 2 is a flowchart for explaining the operation of the merchandise presentation system.
Figure 3:
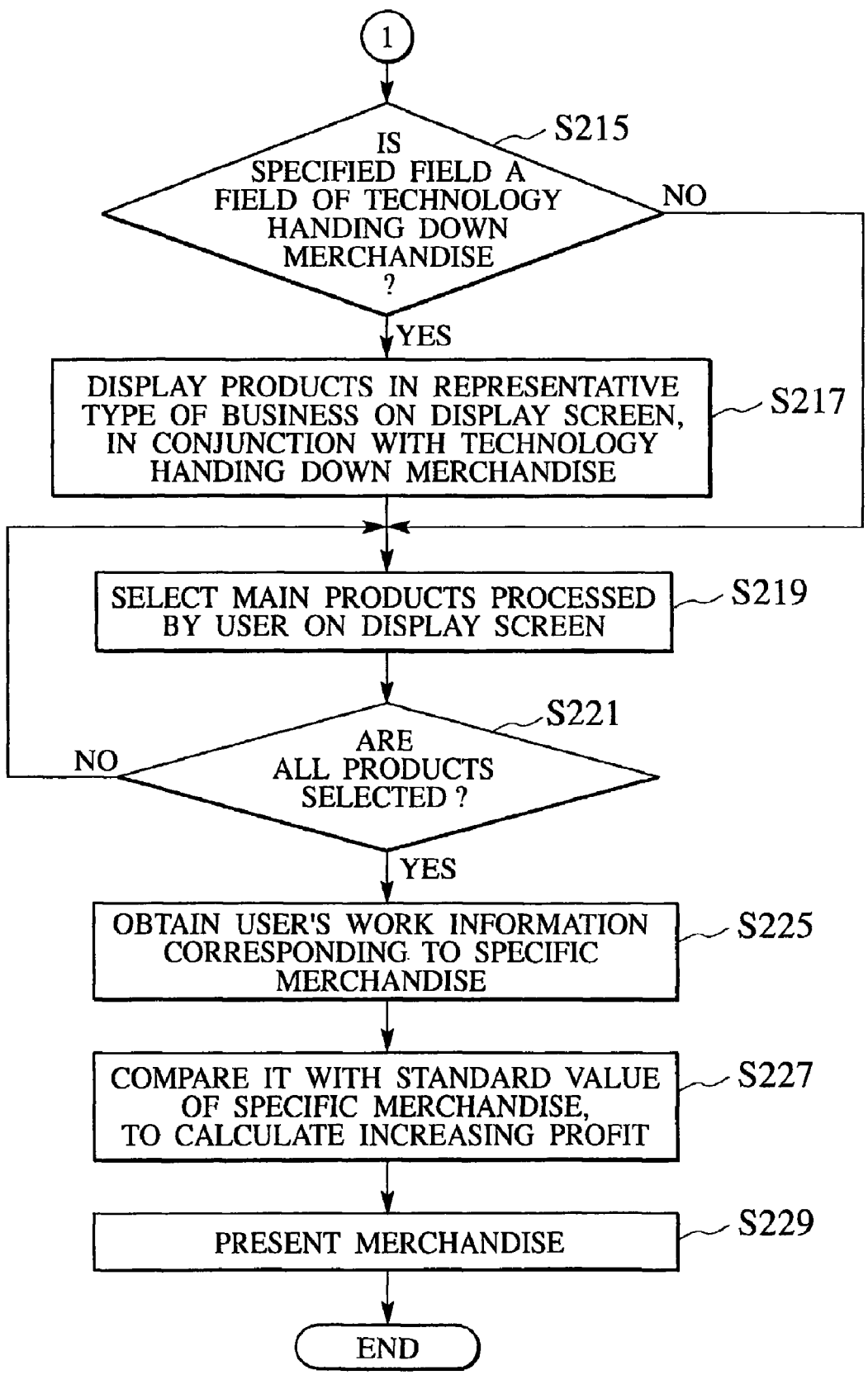
FIG. 3 is a flowchart continuous to FIG. 2.

Referring to FIG. 2 and FIG. 3, the merchandise presentation method using the merchandise presentation system 1 will be described. Explanatory drawings of data in FIG. 4 to FIG. 12 are referred as required.

The merchandise presentation method is a merchandise presentation method for presenting any one of a plurality of merchandise or a combination thereof to a user, comprising steps of preparing a standard value 13a relating to work data, which specifies work performed by a user (S200); obtaining actual work data, which specifies the work actually performed by each user with respect to the work (S201); comparing the actual work data with the standard value (S203); selecting anyone of the plurality of merchandise or a combination thereof, based on the comparison result (S205, S209, S213, S217); calculating increasing profit by using at least one of the selected merchandise (S227); and presenting to the user the content of at least one of the selected merchandise and the increasing profit (S229).

More specifically, the steps are as described below. In the explanation below, it is assumed that the type of business of the user is OA/FA computer manufacturing.

At step. S200, the standard work file 13a, the software file 13b and the product-software relation file 13c of the data are prepared. At step S201, the user information is acquired from the user.

FIG. 4 shows an example of the user information. As shown in this figure, the user information 413a includes: type of business D1 to which the products manufactured by the user belong; size D2 of user's company; workpiece item D3, being the type of products processed by the user per day; number of lots D4, being the number of workpiece corresponding to the workpiece item; new ratio D5, being a ratio of a new product in the products handled by the user; design change ratio D6, being a ratio of a case where there is a design change in the ordered products; repeat ratio D7, being a ratio of processing the same or similar product; time for double checking D8, which is performed by another person whether the development is correct, when processing is performed according to a prepared program; percent defective in development D9, which occurs at the time of developing the product drawing; paper drawing ratio D10, being a ratio of a case where the drawing of a product received by the user from an orderer is a sheet of paper; electronic drawing ratio D11, being a ratio of a case where the drawing of a product received by the user from an orderer is an electronic drawing; and work dividing ratio D12, being a ratio of a case where it is necessary to divide the product, when a product is manufactured.

Reference sign 413b in FIG. 4 shows an example of the obtained user information. In this example, the type of business D1 is OA/FA computer; the size D2 is 30 people; the workpiece item D3 is 60 items/day; the number of lots D4 is 30 pieces/item; the new ratio D5 is 20%; the design change ratio D6 is 5%; the repeat ratio D7 is 35%; the double checking time D8 is 30 minutes; the percent defective in development D9 is 25%; the paper drawing ratio D10 is 90%; the electronic drawing ratio D11 is 10%, and the work dividing ratio D12 is 10%.

At step S203, the data obtained at step S201 is compared with the standard value of the data 13a (see FIG. 13) in the database accumulated by the merchandise supplier.

As described above, the data 13a in the database accumulated by the merchandise supplier is data in which the standard values for the items (D1 to D12) of the OA/FA computer manufacturers are set.

Figure 5:
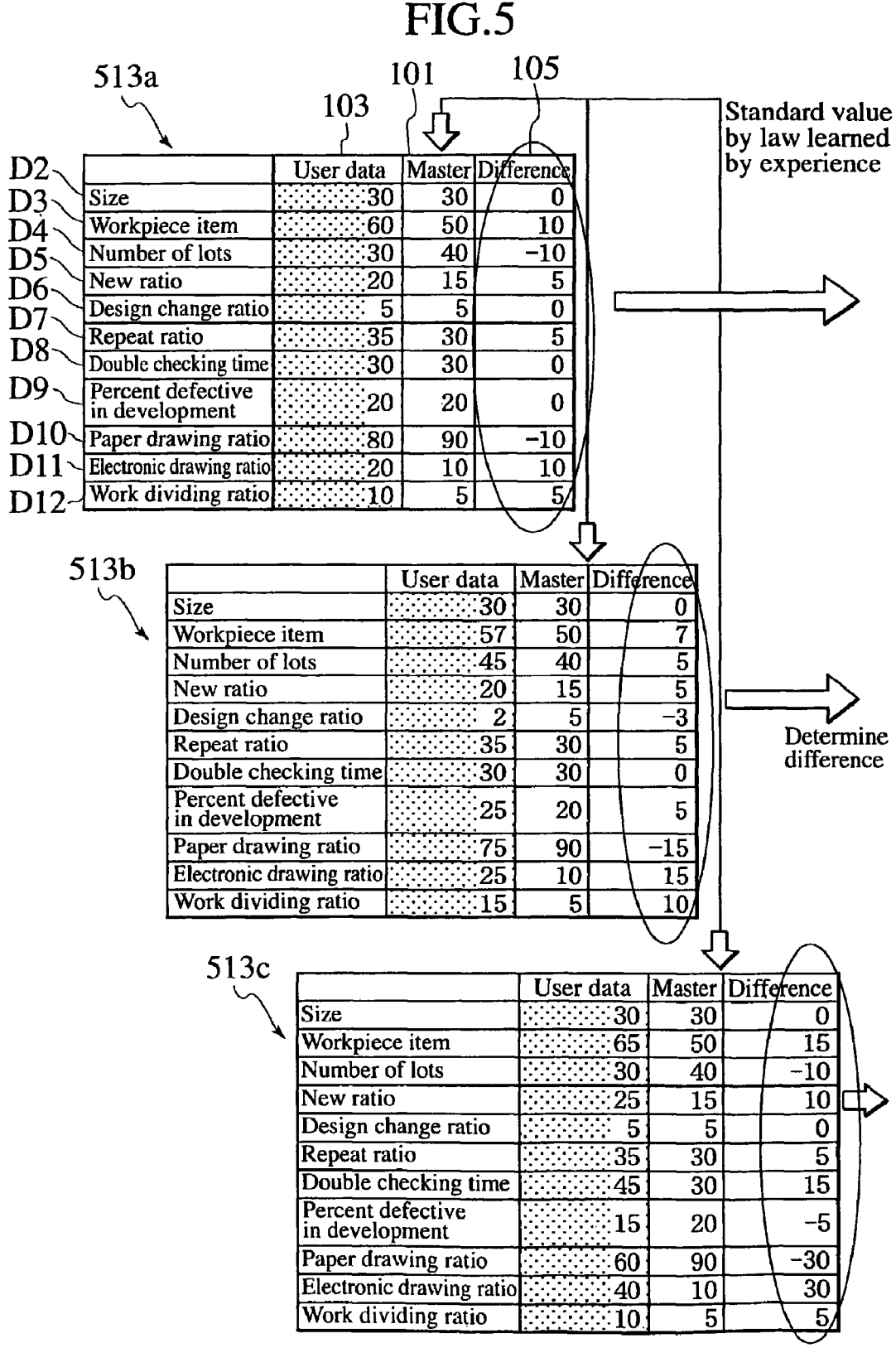
FIG. 5 is a diagram for explaining input and output data.

As a result, as shown in table 513a in FIG. 5, a difference (deviation) 105 between the standard value 101 in the OA/FA computer business and the user data 103 is obtained for the respective items (D2 to D12).

In other words, with respect to the size D2, a difference 0 is obtained between 30 people in the user data and 30 people in the master data. With respect to the workpiece item D3, a difference, 10 items, is obtained between 60 items in the user data and 50 items in the master data. With respect to the number of lots D4, a difference, (minus) 10 pieces, is obtained between 30 pcs. (pieces) in the user data and 40 pcs. in the master data. With respect to the new ratio D5, a difference 5 pcs. is obtained between 20 pcs. in the user data and 15 pcs. in the master data. With respect to the design change ratio D6, a difference 0% is obtained between 5% in the user data and 5% in the master data.

With respect to the repeat ratio D7, a difference 5% is obtained between 35% in the user data and 30% in the master data. With respect to the double-checking time D8, a difference 0 minute is obtained between 30 minutes in the user data and 30 minutes in the master data. With respect to the percent defective in development D9, a difference 0% is obtained between 20% in the user data and 20% in the master data.

With respect to the paper drawing ratio D10, a difference (minus) 10% is obtained between 80% in the user data and 90% in the master data. With respect to the electronic drawing ratio D11, a difference 10% is obtained between 20% in the user data and 10% in the master data. With respect to the work dividing ratio D12, a difference 5% is obtained between 10% in the user data and 5% in the master data.

At step S205, problems or difficulties (time reduction problem, defect rejection problem and technology handing down problem) in manufacturing the products of the user (a user specified by the data in the table 413b in FIG. 4) are judged, based on the comparison results obtained at step S203. The presentation field of the merchandise (computer software) is specified, according to the problems or difficulties. More specifically, for example, the merchandise presentation field is divided into a field of merchandise for time reduction, a field of merchandise for defect rejection, and a field of merchandise for technology handing down, and the optimum field is selected from these fields.

Table 613a in FIG. 6 shows a specific example of the judgment step in the field of OA/FA computer or the like.

For example, each difference 201 data obtained by the processing at step S203 is multiplied by a predetermined time reduction weight 203, respectively, to calculate the time reduction point 209. This time reduction weight is determined beforehand according to the magnitude of influence of the deviation of the work situation of the user from the standard value on the time reduction result. For example, an increase in the number of new products is considerably disadvantageous to the time reduction effect, and hence the time reduction weight 203 with respect to the new ratio is set large.

Similarly, the defect rejection point 214 is calculated by multiplying the difference data 201 by a defect rejection weight 205. The technology handing down point 213 is also calculated by multiplying the difference data 201 by a technology handing down weight 207. The results obtained by summing up the respective points are compared, and a field having the largest value is determined as the merchandise presentation field.

More specifically, as described above, the time reduction weight 203 is respectively set beforehand, for each item of the size D2, the workpiece item D3, the number of lots D4, the new ratio D5, the design change ratio D6, the repeat ratio D7, the double checking time D8, the percent defective in development D9, the paper drawing ratio D10, the electronic drawing ratio D11, and the work dividing ratio D12. The relative importance of the time reduction is calculated as the point 217 (sum total of the time reduction points 209), by multiplying the difference 201 by the time reduction weight 203 and summing up.

The defect rejection weight 205 is set for each item of the workpiece item D3, the number of lots D4, the new ratio D5, the design change ratio D6, the repeat ratio D7, the double checking time D8, the percent defective in development D9, the paper drawing ratio D10, the electronic drawing ratio D11, and the work dividing ratio D12, for each of the type of business D1 and the size D2. The relative importance of the product defect is calculated as the point 218 (sum total of the defect rejection points 214), by multiplying the difference 201 between the user information and the standard value by the defect rejection weight 205 and summing up.

The technology handing down weight 207 is set for each item of the workpiece item D3, the number of lots D4, the new ratio D5, the design change ratio D6, the repeat ratio D7, the double checking time D8, the percent defective in development D9, the paper drawing ratio D10, the electronic drawing ratio D11, and the work dividing ratio D12, for each of the type of business D1 and the size D2. The relative importance of the technology handing down is calculated as the point 219 (sum total of the technology handing down points 213), by multiplying the difference 201 between the user information and the standard value by the technology handing down weight 207 and summing up.

More specifically, the time reduction point 209, 50 points, for the workpiece item D3 is obtained by multiplying 10 pcs., being the difference 201, by 5, being the time reduction weight 203. The defect rejection point 214, 50 points, is obtained by multiplying 10 pcs., being the difference 201, by 5, being the time rejection weight 205. The technology handing down point 213, 50 points, is obtained by multiplying 10 pcs., being the difference 201, by 5, being the technology handing down weight 207.

The time reduction point 209, (minus) 50 points, for the number of lots D4 is obtained by multiplying (minus) 10 pcs., being the difference 201, by 5, being the time reduction weight 203. The defect rejection point 214, (minus) 50 points, is obtained by multiplying (minus) 10 pcs., being the difference 201, by 5, being the time rejection weight 205. The technology handing down point 213, (minus) 50 points, is obtained by multiplying (minus) 10 pcs., being the difference 201, by 5, being the technology handing down weight 207.

In the same manner hereunder, the time reduction point 209, the defect rejection point 214, and the technology handing down point 213 are obtained for the respective items of D5 to D12.

The sum total 217 of the time reduction points, the sum total 218 of the defect rejection points and the sum total 219 of the technology handing down points 213, obtained in the above manner, are compared, and a field having the largest points, that is, any one of or a plurality of (a) OA/FA computer field, (b) switchboard and control panel field, and (c) industrial and specialized instrumentation field is determined as the merchandise presentation field.

At step S207, it is judged whether the merchandise presentation field specified at step S205 is the time reduction field. At step S207, when it is judged that the merchandise presentation field is the time reduction field, control proceeds to step S209. At step S207, when it is judged that the merchandise presentation field is not the time reduction field, control proceeds to step S211.

In the example of the OA/FA computer field in FIG. 6, since the sum total of the time reduction point is 1075 and becomes the largest, control proceeds to step S209.

Figure 7A:
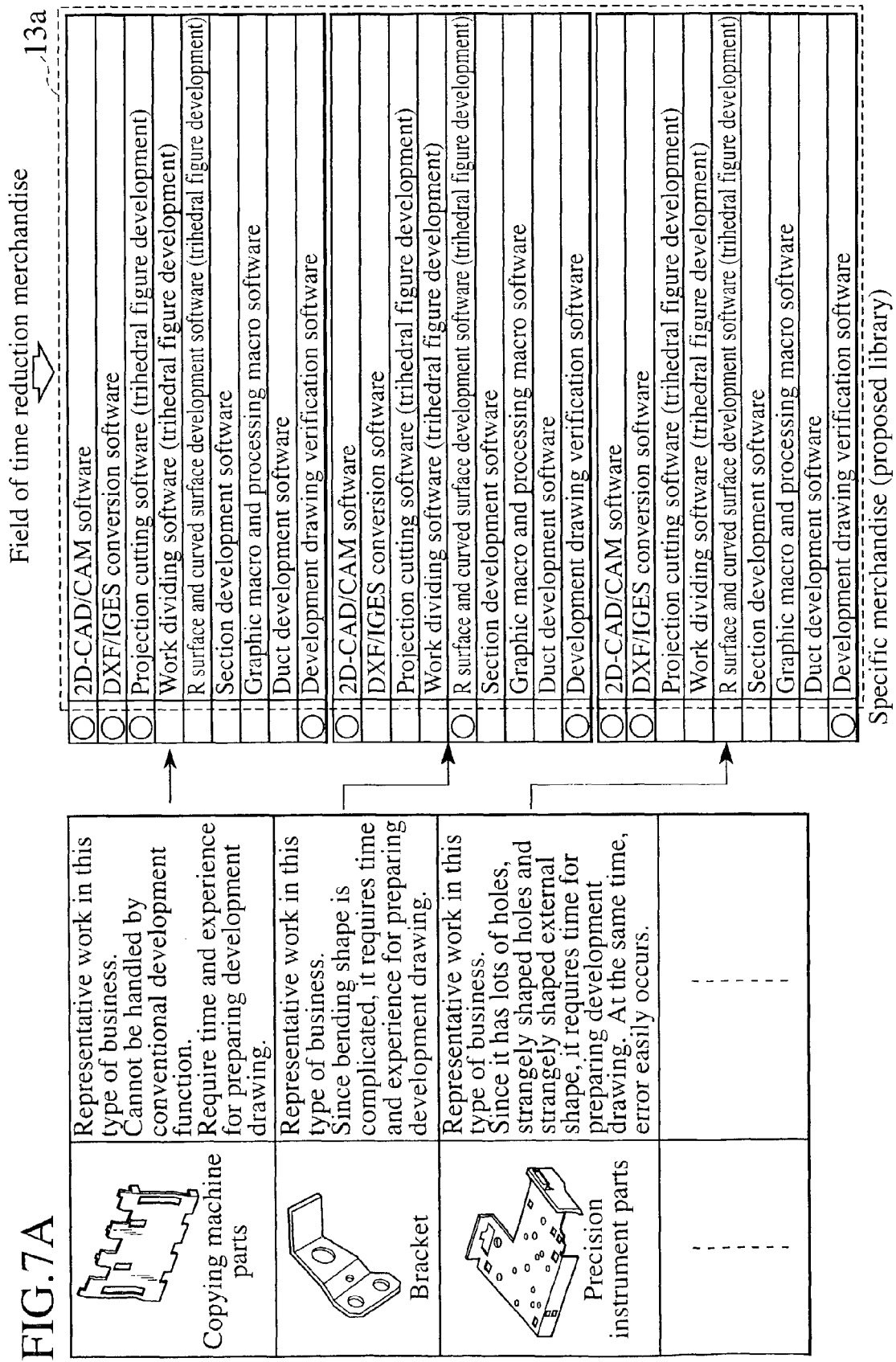
FIGS. 7A and 7B are diagrams for explaining input and output data.

At step S209, various types of products manufactured in the OA/FA computer manufacturing industry are displayed on the display section 3 (FIG. 7A)

FIG. 7A shows OA/FA computer products displayed on the display section 3. This product display is performed based on the type of products stored in the file 13a.

Here, based on the judgment result at step S207, and referring to the data in the file 13a (FIG. 15), the respective displayed products are associated with merchandise (computer software) suitable for time reduction (merchandise data corresponding to time reduction associated with the respective product data is enclosed by a dotted line on the right side in FIG. 7A).

More specifically, as shown in FIG. 7A, the copying machine parts are associated with the 2D-CAD/CAM software, the DXF/IGES conversion software, the projection cutting software (trihedral figure development), and the development drawing developing software, being the presented merchandise. Particularly, since the copying machine parts include lots of hole shapes on a curved surface, the projection cutting software that can accurately draw a figure of the hole shape is displayed with a circle at the left end.

Moreover, the bracket is associated with the 2D-CAD/CAM software, the R surface and curved surface development software (trihedral figure development), and the development drawing verification software. Particularly, since the brackets include lots of R surfaces and curved surfaces, if development is performed using the R surface and curved surface development software, the development time can be shortened. Therefore, the bracket is associated with the R surface and curved surface development software.

The precision instrument parts are associated with the 2D-CAD/CAM software, the DXF/IGES conversion software, and the development drawing verification software. The precision instrument parts include lots of hole shapes. Therefore, the checking time can be shortened by the development drawing verification software. As a result, the precision instrument parts are associated with the development drawing verification software.

At step S211 and S217, "No" is selected, respectively, and control proceeds to step S219.

At step S219, main products processed by the user are selected from a plurality of products displayed on the display section 3. As a result, for example, the copying machine parts, brackets and precision instrument parts in FIG. 7A are selected.

At step S221, it is judged whether all of the main products to be processed by the user are selected. When it is judged that all of the main products are not selected at step S221, control returns to step S219, to select the next product.

At step S225, work information of the user corresponding to the selected products is obtained (for calculating the increasing profit described later).

FIG. 8 shows the user work information obtained from the user, in conjunction with manufacturing of the copying machine parts. For example, the user's working hour relating to the 2D-CAD/CAM software is 40 minutes per item for inputting the drawing. The user's working hour relating to the DXF/IGES conversion software is 40 minutes per item for inputting the drawing. The user's working hour relating to the projection cutting software is 60 minutes per item for cutting the projection. The user's working hour relating to the development drawing verification software is 20 minutes per item for verifying the development drawing. The charge therefor is ¥4,000 per hour. The number of days worked is 20 days per month.

FIG. 9 shows the user work information obtained from the user, in conjunction with bracket manufacturing. For example, the specified merchandise is the 2D-CAD/CAM software, the R surface and curved surface development software (trihedral figure development), and the development drawing verification software. User's working hour corresponding to the R surface and curved surface development software (trihedral figure development) is 35 minutes per item for inputting the drawing. User's working hour corresponding to the development drawing verification software is 10 minutes per item. The charge therefor is ¥4,000 per hour. The number of days worked is 20 days per month.

FIG. 10 shows the user's work information obtained from the user, in conjunction with manufacturing of the precision instrument parts. For example, the DXF conversion time is 20 minutes per item. The working hour for the hole chart, being the time for recognizing hole shapes in the product, is 10 minutes per item. The surface extraction work for defining the surface in the trihedral figure for preparing a three-dimensional figure is 40 minutes per item. The working hour for combining the extracted surfaces is 20 minutes per item. The user's working hour corresponding to the development drawing verification software is 30 minutes per item. The charge therefor is ¥4,000 per hour. The number of days worked is 20 days per month.

At step S227, calculation of the increasing profit by introducing the new merchandise is performed, based on the work information from the user.

As shown in FIG. 11A, in the case of copying machine parts, the user's increasing profit is obtained as a total of differences between the user's working hour and the standard time (standard work data in FIG. 15) when using the specific merchandise. By multiplying the total hours of difference, 88 minutes, the number of products 2, the number of days worked 20 days, and the charge ¥4,000 per 60 minutes, the increasing profit ¥234,667 per month can be obtained.

As shown in FIG. 11B, in the case of brackets, a difference between the user's working hour corresponding to the specific merchandise, and the standard time when using the specific merchandise is obtained. By multiplying 33 minutes obtained by adding these values, the number of products 6, the number of days worked 20 days, and the charge ¥4,000 per 60 minutes, the increasing profit ¥264,000 per month can be obtained.

As shown in FIG. 11C, in the case of the precision instrument parts, a difference between the user's working hour corresponding to the specific merchandise, and the standard time when using the specific merchandise is obtained. By multiplying 82 minutes obtained by adding these values, the number of products 4, the number of days worked 20 days, and the charge ¥4,000 per 60 minutes, the increasing profit ¥437,333 per month can be obtained.

In the presentation processing at step S229, the increasing profit is informed to the user, and specific merchandise is presented. As shown in FIG. 12A, in the case of copying machine parts, various kinds of software shown in the upper table in FIG. 12A are proposed as a proposed software library for generating time reduction effect. As shown in the lower table in this figure, the monthly increasing profit ¥234,667, the annual increasing profit ¥2,816,000, and the increasing profit ¥14,080,000 for five years to be expected are calculated and presented to the user.

As shown in FIG. 12B, in the case of brackets, various kinds of software shown in the upper table in this figure are proposed as a proposed software library for generating time reduction effect. As shown in the lower table in this figure, the monthly increasing profit ¥264,000, the annual increasing profit ¥3,168,000, and the increasing profit ¥15,840,000 for five years to be expected are calculated and presented to the user.

As shown in FIG. 12C, in the case of precision instrument parts, various kinds of software shown in the upper table in this figure are proposed as a proposed software library for generating time reduction effect. As shown in the lower table in this figure, the monthly increasing profit ¥437,333, the annual increasing profit ¥5,248,000, and the increasing profit ¥26,240,000 for five years to be expected are calculated and presented to the user.

The above explanation is for a case where the field of time reduction merchandise is specified at step S205. When the field of the defect rejection merchandise is specified, at step S211, it is judged that it is the field of the defect rejection merchandise, and control proceeds to step S213. In the display processing at step S213, main products processed by the user are displayed from the products registered for each type of business. Thereby, the merchandise to be presented can be selected.

In the case of the field of the defect rejection merchandise, at least one of the development drawing verification software for automatically generating a three dimensional figure from a development drawing, to automatically generate and verify dimensions in this three dimensional figure, batch type stereograph software for printing the stereograph, and prototype verification software for performing experimental work including confirmation if bending is possible on the CG, before actual processing, based on the stereograph of the product, being computer software suitable for defect rejection corresponding to the product, is appropriately associated with the product.

At step S205, when the field of the technology handing down is specified, at step S217, products in the representative type of business are displayed, in conjunction with the technology handing down merchandise (software).

In the case of the field of the technology handing down merchandise, merchandise such as a vending expert system in which determination of bending information (bending sequence, mold tool, mold tool layout) is performed by development in the head of a veteran (expert) of bending work, to register the final correction value, technology handing down software in which all data required for bending is registered in the database, and the data is invoked to the bending machine in a moment by anyone, to reduce the arrangement at the repeat operation, and computer software for inputting a development drawing and automatically outputting bending availability and bending information (bending sequence, mold tool, mold tool layout) by computer processing, being computer software suitable for technology handing down corresponding to the product, are associated with the product.

In the above explanation, it is assumed that the user's type of business is OA/FA computer manufacturing, but similar processing can be performed in other type of business.

Table 513b in FIG. 5 shows an example in which when the user's type of business is relating to switchboards and control panels, a read difference between the basic information obtained from the user and the standard value in the switchboard and control panel industry is obtained.

In other words, since the standard values registered in the database are different from those in the OA/FA computer industry, with respect to the size D2, a difference 0 person is obtained between 30 people in the user data and 30 people in the master data. With respect to the workpiece item D3, a difference, 7 items, is obtained between 57 items in the user data and 50 items in the master data. With respect to the number of lots D4, a difference, 5 pieces, is obtained between 45 pieces in the user data and 40 pieces in the master data.

With respect to the new ratio D5, a difference, 5 pcs., is obtained between 20 pcs. in the user data and 15 pcs. in the master data. With respect to the design change ratio D6, a difference (minus) 3% is obtained between 2% in the user data and 5% in the master data.

With respect to the repeat ratio D7, a difference 5% is obtained between 35% in the user data and 30% in the master data. With respect to the double checking time D8, a difference 0 minute is obtained between 30 minutes in the user data and 30 minutes in the master data. With respect to the percent defective in development D9, a difference 5% is obtained between 25% in the user data and 20% in the master data.

With respect to the paper drawing ratio D10, a difference (minus) 15% is obtained between 75% in the user data and 90% in the master data. With respect to the electronic drawing ratio D11, a difference 15% is obtained between 25% in the user data and 10% in the master data. With respect to the work dividing ratio D12, a difference 10% is obtained between 15% in the user data and 5% in the master data.

Similarly, table 513c in FIG. 5 shows an example in which when the user's type of business is, for example, machine tools and cover industry, a read difference between the basic information obtained from the user and the standard value in the machine tools and cover industry is obtained.

In other words, with respect to the size D2, a difference 0 person is obtained between 30 people in the user data and 30 people in the master data. With respect to the workpiece item D3, a difference, 15 items, is obtained between 65 items in the user data and 50 items in the master data. With respect to the number of lots D4, a difference, (minus) 10 pieces, is obtained between 30 pieces in the user data and 40 pieces in the master data. With respect to the new ratio D5, a difference 10% is obtained between 25% in the user data and 15% in the master data. With respect to the design change ratio D6, a difference 0% is obtained between 5% in the user data and 5% in the master data.

With respect to the repeat ratio D7, a difference 5% is obtained between 35% in the user data and 30% in the master data. With respect to the double checking time D8, a difference, 15 minutes, is obtained between 45 minutes in the user data and 30 minutes in the master data. With respect to the percent defective in development D9, a difference (minus) 5% is obtained between 15% in the user data and 20% in the master data.

With respect to the paper drawing ratio D10, a difference (minus) 30% is obtained between 60% in the user data and 90% in the master data. With respect to the electronic drawing ratio D11, a difference 20% is obtained between 40% in the user data and 10% in the master data. With respect to the work dividing ratio D12, a difference 5% is obtained between 10% in the user data and 5% in the master data.

Table 613b in FIG. 6 shows an example in which the field of the defect rejection merchandise becomes largest in the type of business of switchboards and control panels.

In other words, as the time reduction point 209 in the workpiece item D3, 210 points are obtained by multiplying a difference, 7 pieces, by the time reduction weight 30. As the defect rejection point 214, 280 points are obtained by multiplying a difference, 7 pieces, by the defect rejection weight 40. As the technology handing down point 213, 35 points are obtained by multiplying a difference, 7 pieces, by the technology handing down weight 5.

As the time reduction point 209 in the number of lots D4, 100 points are obtained by multiplying a difference, 5 pieces, by the time reduction weight 20. As the defect rejection point 214, 25 points are obtained by multiplying a difference, 5 pieces, by the defect rejection weight 5. As the technology handing down point 213, 150 points are obtained by multiplying a difference, 5 pieces, by the technology handing down weight 30.

In the similar manner hereunder, the time reduction point 209, the defect rejection point 214 and the technology handing down point 213 are respectively obtained with respect to the respective items D5 to D12.

The sum total 217 of the time reduction points 209, the sum total 218 of the defect rejection points 214, and the sum total 219 of the technology handing down points 213, obtained in the above manner, are compared with each other, to decide the field having the largest points as the merchandise presentation field.

Table 613c in FIG. 6 shows an example in which the field of the technology handing down merchandise becomes largest in the type of business of machine tools and cover industry. In other words, as the time reduction point 209 in the workpiece item D3, 75 points are obtained by multiplying a difference, 15 pieces, by the time reduction weight 5. As the defect rejection point 214, 75 points are obtained by multiplying a difference, 15 pieces, by the defect rejection weight 5. As the technology handing down point 213, 1200 points are obtained by multiplying a difference, 15 pieces, by the technology handing down weight 80.

As the time reduction point 209 in the number of lots D4, (minus) 200 points are obtained by multiplying a difference, (minus) 10 pieces, by the time reduction weight 20. As the defect rejection point 214, (minus) 50 points are obtained by multiplying a difference, (minus) 10 pieces, by the defect rejection weight 5. As the technology handing down point 213, (minus) 50 points are obtained by multiplying a difference, (minus) 10 pieces, by the technology handing down weight 5.

In the similar manner hereunder, the time reduction point 209, the defect rejection point 214 and the technology handing down point 213 are respectively obtained with respect to the respective items D5 to D12.

The sum total 217 of the time reduction points, the sum total 218 of the defect rejection points, and the sum total 219 of the technology handing down points, obtained in the above manner, are compared with each other, to decide the field having the largest points as the merchandise presentation field.

Figure 7B:
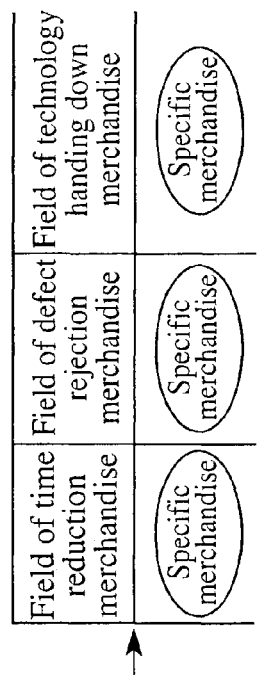

FIG. 7B shows one example in which the merchandise to be presented is specified, when the type of business is different. For example, when the type of business is switchboards and control panels, console panels, switchboard panels, intermediate plates of the switchboard and the like are registered. When these products are selected, merchandise to be presented, associated with the products for the respective fields, is specified. When the type of business is machine tools and covers, for example, products such as machine covers, oil pans and chutes are registered. When these products are selected, merchandise to be presented, associated with the products for the respective fields, is specified.

Here, on the screen in the display section, as shown in FIG. 7B, a table chart of machine tools and control panels is displayed by partially overlapped by a table chart of machine tools and covers, so that a plurality of kinds of table charts can be seen obviously, and the table charts can be seen in a large size.

Further, in addition to this figure, with respect to FIG. 4 to FIG. 15, an individual table chart can be displayed or a plurality of table charts can be displayed at the same time on one screen in the display section of the merchandise presentation system, by shifting and partially (shiftingly) overlapping the table charts.

As described above, the user can select merchandise, by referring to the increasing profit based on the present invention.

The present invention is not limited to this embodiment, and can be executed in other modes by adding appropriate changes.

The invention claimed is:

1. A product presentation method implemented by a computer, comprising:
   predetermining, by the computer, at least one standard value relating to at least one activity relevant to developing a product performed by a theoretical standard user;
   obtaining, by the computer, at least one actual value relating to at least one activity relevant to developing a product performed by an actual human user;
   comparing, by the computer, the at least one standard value to the at least one actual value;
   selecting, by the computer, based on a result of the comparing and a weighting of relative importance of technology transfer, defect rejection and time reduction, at least one of: a technology transfer product that accumulates manufacturing expertise from previous processings of the product, a defect rejection product that increases an ability of the actual human user to meet a predetermined manufacturing tolerance specification for manufacturing the product, and a time reduction product that reduces an amount of time taken, by the actual human user, to manufacture the product;
   calculating, by the computer, a projected profit increase for the actual human user when a selected at least one product is used by the actual human user; and
   presenting, by the computer, the selected at least one product and the calculated projected profit increase.

2. The product presentation method according to claim 1, wherein the selected at least one product is further selected based on an attribute of the product manufactured as a result of the at least one activity relevant to developing the product performed by the actual human user.

3. The product presentation method according to claim 1, wherein the product comprises a sheet metal product.

4. The product presentation method according to claim 1, wherein the at least one actual value relates to at least one of: a percentage of defective products produced, an amount of time required to double check the product, and a ratio of a number of cases for which a design for the product is changed to a number of cases for which the design for the product is not changed.

5. A product presentation method implemented by a computer, comprising:
   acquiring, by the computer, at least one user value relating to at least one activity relevant to developing a product performed by an actual human user;
   comparing, by the computer, the at least one user value with at least one standard value held by a product supplier and relating to at least one activity relevant to developing a product performed by a theoretical standard user;
   generating, by the computer, deviation data corresponding to a deviation of the at least one user value with respect to the at least one standard value;
   analyzing, by the computer, the at least one activity relevant to developing the product performed by the actual human user based on the deviation data;
   generating, by the computer, a result of the analysis;
   selecting, by the computer, based on the result of the analysis and a weighting of relative importance of technology transfer, defect rejection and time reduction, at least one of: a technology transfer product that accumulates manufacturing expertise from previous processings of the product, a defect rejection product that increases an ability of the actual human user to meet a predetermined manufacturing tolerance specification for manufacturing the product, and a time reduction product that reduces an amount of time taken, by the actual human user, to manufacture the product;

generating, by the computer, specific product data for a selected at least one product; and calculating, by the computer, a projected profit increase when using the selected at least one product.

6. The product presentation method according to claim 5, wherein the at least one activity relevant to developing the product relates to production of sheet metal products.

7. The product presentation method according to claim 6, further comprising:

determining a reduction in time required to perform the at least one activity relevant to developing the product, and a reduction in defective products produced by the at least one activity relevant to developing the product.

8. The product presentation method according to claim 7, wherein the computer is connectable to the Internet, and wherein the actual human user calculates the projected profit increase using the computer connectable to the Internet.

9. The product presentation method according to claim 5, wherein the product comprises a sheet metal product.

10. The product presentation method according to claim 5, wherein the at least one user value relates to at least one of: a percentage of defective products produced, an amount of time required to double check the product, and a ratio of a number of cases for which a design for the product is changed to a number of cases for which the design for the product is not changed.

11. A product presentation system, comprising:

a predeterminer, implemented on a computer, that predetermines at least one standard value relating to at least one activity relevant to developing a product performed by a theoretical standard user;

an obtainer, implemented on the computer, that obtains at least one actual value relating to at least one activity relevant to developing a product performed by an actual human user;

a comparer, implemented on the computer, that compares the at least one standard value to the at least one actual value;

a selector, implemented on the computer, that selects, based on a result obtained by the comparer and a weighting of relative importance of technology transfer, defect rejection and time reduction, at least one of: a technology transfer product that accumulates manufacturing expertise from previous processings of the product, a defect rejection product that increases an ability of the actual human user to meet a predetermined manufacturing tolerance specification for manufacturing the product, and a time reduction product that reduces an amount of time taken, by the actual human user, to manufacture the product;

a calculator, implemented on the computer, that calculates a projected profit increase for the actual human user if a selected at least one product is used by the actual human user; and a presenter, implemented on the computer, that presents the selected at least one product and the calculated projected profit increase.

12. The product presentation system according to claim 11, wherein the selected at least one product is selected based on an attribute of the product manufactured as a result of the at least one activity relevant to developing the product performed by the actual human user.

13. The product presentation system according to claim 11, wherein the product comprises a sheet metal product.

14. The product presentation system according to claim 11, wherein the at least one actual value relates to at least one of: a percentage of defective products produced, an amount of time required to double check the product, and a ratio of a number of cases for which a design for the product is changed to a number of cases for which the design for the product is not changed.

15. A product presentation system, comprising:

an information acquirer, implemented on a computer, that acquires at least one user value relating to attributes characteristic of at least one activity relevant to developing a product to be performed by an actual human user;

a comparer, implemented on the computer, that compares the at least one user value with at least one standard value held by a product supplier and relating to at least one activity relevant to developing a product performed by a theoretical standard user;

a deviation generator, implemented on the computer, that generates deviation data corresponding to a deviation of the at least one user value with respect to the at least one standard value;

an analyzer, implemented on the computer, that analyzes the at least one activity relevant to developing the product to be performed by the actual human user based on the deviation data;

an analysis result generator, implemented on the computer, that generates a result of the analysis;

a product data reader, implemented on the computer, that reads product data characteristic of the product, to determine, based on the result of the analysis and a weighting of relative importance of technology transfer, defect rejection and time reduction, at least one of: a technology transfer product that accumulates manufacturing expertise from previous processings of the product, a defect rejection product that increases an ability of the actual human user to meet a predetermined manufacturing tolerance specification for manufacturing the product, and a time reduction product that reduces an amount of time taken, by the actual human user, to manufacture the product;

a specific product data generator, implemented on the computer, that generates specific product data for a selected at least one product; and a profit calculator, implemented on the computer, that calculates a projected profit increase when using the selected at least one product.

16. The product presentation system according to claim 15, wherein the at least one activity relevant to developing the product relates to production of sheet metal products.

17. The product presentation system according to claim 16, wherein the analysis result generator determines a reduction in time required to perform the at least one activity relevant to developing the product, and a reduction in defective products produced by the at least one activity relevant to developing the product.

18. The product presentation system according to claim 17, wherein the computer is connectable to the Internet, and wherein the actual human user calculates the projected profit increase using the computer connectable to the Internet.

19. The product presentation system according to claim 15, wherein the product comprises a sheet metal product.

20. The product presentation system according to claim 15, wherein the at least one user value relates to at least one of: a percentage of defective products produced, an amount of time required to double check the product, and a ratio of a number of cases for which a design for the product is changed to a number of cases for which the design for the product is not changed.

* * * * *